Dec. 7, 1965   J. J. MURPHY   3,222,440
PROCESS AND APPARATUS FOR THE PRODUCTION OF ORIENTED PLASTIC NET
Filed July 30, 1962   2 Sheets-Sheet 2

INVENTOR.
JOHN J. MURPHY
BY
*John F. Hohmann*
ATTORNEY

United States Patent Office 3,222,440
Patented Dec. 7, 1965

3,222,440
PROCESS AND APPARATUS FOR THE PRODUCTION OF ORIENTED PLASTIC NET
John J. Murphy, New York, N.Y., assignor to Union Carbide Corporation, a corporation of New York
Filed July 30, 1962, Ser. No. 213,281
9 Claims. (Cl. 264—167)

This application is a continuation-in-part of application Serial No. 793,568, filed February 16, 1959, now abandoned.

The present invention relates generally to a process and apparatus for producing oriented plastic net and, more particularly, to a process and apparatus for continuously orienting tubular plastic net.

Heretofore, a number of processes have been proposed for producing tubular plastic net. More recently, such processes have been proposed which operate on a continuous basis rather than a batch basis. It has also been suggested heretofore to stretch orient such net so as to increase its strength. However, attempts to orient tubular net on a continuous basis have led to a number of problems. Among these problems are the tendency of the net to neck in, which distorts the mesh pattern in the final product; the ability of net subjected to a stretching force to change its mesh pattern without orienting; the tendency of the bonds of certain nets to stretch before or along with the strands between the bonds, thereby weakening the bonds; surging of the net during stretching, which produces successive stretched and unstretched areas in the net; and fibrillation of the strands.

It is, therefore, the main object of the present invention to provide a process and apparatus for producing oriented tubular plastic net which overcomes all the aforementioned problems.

It is another object of the invention to provide a process and apparatus for continuously orienting tubular plastic net in a uniform fashion.

It is a further object of the invention to provide such a process and apparatus which is capable of achieving maximum orientation in tubular plastic net.

It is still a further object of the invention to provide a process and apparatus for stretch orienting tubular plastic net with a minimum of stretching in the bonds of the net.

Other aims and advantages of the invention will be apparent from the following description and appended claims.

Figure 1:
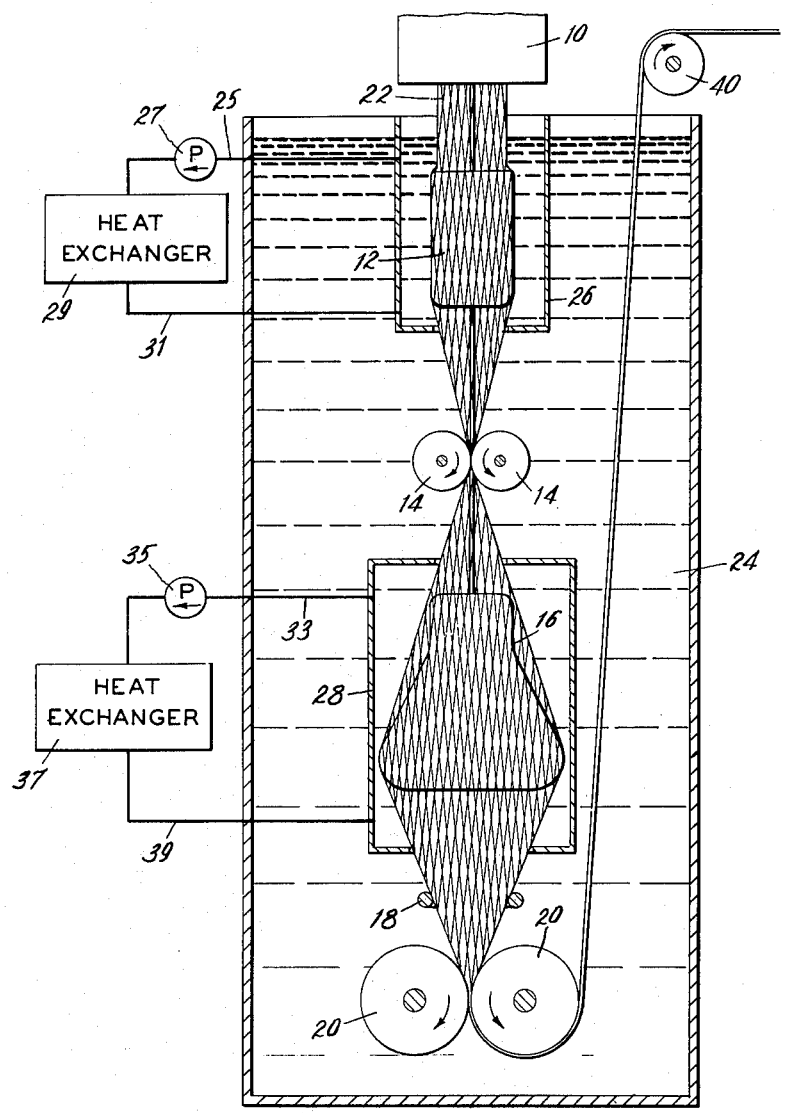
FIG. 1 is an elevation view, partially in cross section, of a preferred embodiment of the present invention.

As used herein, the term "plastic" refers to:

(a) A synthetic thermoplastic resin capable of melt extrusion or compression extrusion in a molten state through dies and settable by a cooling medium on issuance from the dies. Suitable thermoplastic materials include polyamides or superpolyamides, such as nylon; polyesters; vinyl polymers such as vinyl acetate polymers, styrene polymers, acrylonitrile polymers, vinyl chloride polymers such as polyvinyl chloride and copolymers of vinyl chloride with other ethylenically unsaturated monomers such as vinyl acetate, vinylidine chloride, and like monomers; polyolefins such as polyethylene, polypylene, and like thermoplastic polymers.

(b) Natural or synthetic rubbers, subsequently vulcanized or containing vulcanizing agents.

(c) Those thermosetting plastic materials or mixtures thereof with thermoplastic materials, which are capable of melt extrusion.

(d) Natural and synthetic fiber-forming materials extrudable from solvent solution, such as cupramonium cellulose or protein material (e.g., from soya bean), cellulose acetate, as well as many thermoplastic resins as mentioned above, dissolved or dispersed in a solvent and capable of extrusion and setting by immersion in or spraying with a coagulant as the plastic mass emerges from the dies.

(e) Foamable compositions containing any of the above materials.

In accordance with the present invention, a process and apparatus are provided for orienting tubular plastic net by stretching the tubular net in an axial direction while passing the net over a mandrel having a diameter substantially greater than the internal diameter of the net, thereby simultaneously stretching the tubular net in both axial and radial directions, the net being maintained at an orientation temperature while being stretched. In order to reduce the tendency of the net bonds to stretch along with the connecting fibers between the bonds, it is important that the plastic net be set before it is stretched.

The inventive process stretches the net simultaneously in both axial and radial directions, thereby preventing necking in of the net and further reducing the tendency of the net bonds to stretch along with the connecting fibers. The two-directional stretching also prevents the net from merely changing its mesh pattern without orienting and prevents surging of the net. The radial stretching is achieved by passing the tubular net over a mandrel having a diameter substantially larger than, preferably at least twice as large as, the internal diameter of the net. The simultaneous axial stretching is achieved by subjecting the net to an axial stretching force as it is withdrawn from the mandrel while restraining that portion of the net preceding the mandrel against such axial stretching. For example, the axial stretching force may be exerted on the net by withdrawing it from the mandrel through a first pair of driven nip rolls while the restraining or resisting force is exerted on that portion of the net preceding the mandrel by means of a second pair of nip rolls driven at a speed below that of the first pair of nip rolls. Both pairs of nip rolls should be spaced close enough together to flatten the tubular net and frictionally engage the surfaces thereof.

In order to increase the strength of the tubular net, it is essential that the net be maintained at an orientation temperature while it is ebing stretched. The exact temperature employed depends on the particular plastic material of which the net is made, and suitable orientation temperatures for various materials are well known in the extrusion industry. For example, most high-density polyethylenes can be oriented at temperatures between about 80° C. and about 120° C.; intermediate density polyethylene can be oriented from 40° C. to 80° C.; low density polyethylene can be oriented from 24° C. to 40° C.; and polypropylene can be oriented from 90° C. to 130° C.

The inventive process and apparatus will now be described in greater detail by referring to the drawings. The preferred embodiment shown in FIG. 1 comprises, in general, extrusion apparatus 10 for producing the tubular net, a cooled former 12 for setting the extruded net, a pair of nip rolls 14 for resisting the axial stretching force, a stretching mandrel 16, a collapsing ring 18, and a pair of nip rolls 20 for exerting the axial stretching force.

The extrusion apparatus 10 may be any suitable apparatus for extruding tubular plastic net, and a number of such apparatus are known in the art. Typical examples of such apparatus are described in detail in U.S. Patents No. 2,919,467; No. 3,019,147; and No. 3,012,275, and in Belgium Patent No. 552,251. Since reference may be had to such patents for any information desired as to the extrusion apparatus 10, further details thereof will not be set forth in the present specification. Although the net is preferably formed by extrusion, the present invention is equally applicable to tubular net formed by other processes. For example, the net could be formed by molding, by conventional weaving techniques, or by die cutting from a solid tube. Similarly, the present process is applicable to a great variety of net structures. For example, all the warp strands may be on one side of the net and all the weft strands on the other side, or the strands may cross each other on alternate sides. Alternatively, the strands may merely touch each other without actually crossing, or the net may be formed as an integral unit. Also, any number of circular layers or arrangements of strands and a great variety of mesh patterns may be used. The size of the strands and the size of the mesh openings are not critical and depend mainly on the intended use.

Although the present invention is applicable to all the aforementioned tubular nets, it has proved especially useful for tubular net produced by contacting and separating plastic fibers after they have been extruded, i.e., contacting the fibers outside rather than inside the extrusion die. Net produced by this process generally has slightly less material in the bonds. As a result, it is especially important to keep the stretching in the bonds of this type of net to a minimum.

From the extrusion apparatus 10, the tubular plastic net 22 is passed over a former 12 immersed in a liquid bath 24. The diameter of the former 12 should be at least as large as the internal diameter of the net 22 to maintain the diameter of the net during setting. The former 12 preferably has a diameter slightly larger than that of the net to assist in bonding the fibers together. In such cases, it is generally preferred to have a sharp outer peripheral edge on the top of the former to press the net bonds tightly together. As shown in FIG. 1, the former 12 is surrounded by a cyclindrical drum 26 with an open top and a hole in the bottom thereof to permit withdrawal of the tubular net. The drum 26 separates the liquid around the former 12 from the remainder of the bath 24 so that the liquid within the drum 26 may be maintained at a setting temperature for the plastic net 22 regardless of the temperature of the main bath 24. The temperature of the liquid within the drum 26 is controlled by pumping a portion of the liquid through a line 25 by means of a pump 27 and into a heat exchanger 29. The heat exchanger 29 adjusts the temperature of the liquid as desired and then discharges it through a line 31 back into the drum 26. The flow rate in this heat exchange system depends mainly on the degree of heat exchange that takes place between the liquid in the drum 26 and the main bath 24. The setting temperature required in the liquid in the drum 26 is not narrowly critical, and setting temperatures for various plastic materials are well known in the art. For example, high-density polyethylene nets may be set at temperatures below about 80° C.

From the former 12, the tubular net passes downwardly through the opening in the bottom of the drum 26 and through a pair of driven nip rolls 14. The nip rolls 14 are driven in the directions indicated by the arrows and are located sufficiently close to each other to flatten the tubular net 22 and frictionally engage the flattened surface thereof. Thus, the nip rolls 14 offer a firm resistance to any force tending to pull the flattened net therefrom at a rate greater than the rate at which the rolls 14 are actually driven. The nip rolls 14 should have surfaces of rubber or other material capable of frictionally engaging the net 22 and are driven by any suitable driving means, such as a motor (not shown).

From the nip rolls 14, the tubular net 22 passes downwardly over a stretching mandrel 16 which has a diameter substantially larger than the internal diameter of the net 22 so as to stretch the net in a radial direction. The exact diameter of the mandrel 16 depends mainly on the degree of radial stretching desired in the tubular net. The diameter of the mandrel 16 is preferably at least twice as great as the internal diameter of the net 22, and it is usually desirable to have a mandrel diameter between 5 and 10 times the diameter of the unstretched net. The shape of the mandrel 16 is not critical. Other suitable mandrel shapes are spheres, discs, cones, or any other shape preferably with an elliptical horizontal cross-section with the larger diameter of the ellipse parallel to the axes of the nip rolls 14. The surface of the mandrel should be smooth to permit the net to glide freely thereover.

As shown in FIG. 1, the mandrel 16 is surrounded by a cylindrical drum 28 with holes in the top and bottom thereof to permit the passage of the tubular net 22 therethrough. The drum 28 separates the liquid around the mandrel 16 from the remainder of the bath so that the liquid in the drum may be maintained at an orientation temperature for the plastic net 22 regardless of the temperature of the main bath 24. The temperature of the liquid within the drum 28 is controlled by pumping a portion of the liquid through a line 33 by means of a pump 35 and into a heat exchanger 37. The heat exchanger 37 adjusts the temperature of the liquid as desired and then discharges it through a line 39 back into the drum 28. The flow rate in the heat exchange system depends mainly on the degree of heat exchange that takes place between the liquid in the drum 28 and the main bath 24. The orientation temperature required in the liquid in the drum 28 depends on the particular plastic material comprising the net 22 being stretched, and suitable orientation temperatures for various plastic materials are well known in the art. For example, high-density polyethylene nets may be oriented at temperatures between 80° C. and 120° C.

From the mandrel 16, the net 22 is passed downwardly through the opening in the bottom of the tank 28 and through a collapsing ring 18 spaced coaxially from the bottom of the mandrel 16. The purpose of the collapsing ring 18 is to equalize the tension in the tubular net around the mandrel 16, thereby producing meshes of uniform size and shape and strands of uniform diameter. The collapsing ring 18 has an internal diameter substantially smaller than the diameter of the mandrel 16, preferably about equal to the diameter of the unstretched net emerging from the extrusion apparatus 10. Of course, where the diameter of the mandrel 16 is many times as great as the diameter of the unstretched net, the internal diameter of the collapsing ring may be larger than the diameter of the unstretched net. The spacing between the collapsing ring 18 and the mandrel 16 is not narrowly critical, but it is preferred to locate the ring 18 about midway between the mandrel 16 and the take-off rolls 20. The inner surface of the collapsing ring should be smooth so as to permit the net to glide freely thereover.

The net is withdrawn from the mandrel 16 and the collapsing ring 18 by means of a pair of nip rolls 20. The nip rolls are located sufficiently close to each other to flatten the tubular net 22 and frictionally engage the flattened surfaces thereof. The nip rolls 20 are driven at a faster rate than the nip rolls 14 so that the portion of the net between the nip rolls 20 and the nip rolls 14 is stretched in an axial direction while it is being passed over the mandrel 16. In other words, the tubular net is simultaneously stretched in both axial and radial directions, the radial stretching being effected by the stretching mandrel 16 and the axial stretching being effected by the two sets of nip rolls. The nip rolls 20 subject the net to an axial stretching force while the nip rolls 14 restrain the net against axial stretching. Additional resistance to the axial stretching force is afforded by the former 12, so practically none of the stretching force reaches the unset net above the former 12. As a result, only the net which has been set is stretched, and little or no stretching takes place in the net bonds. The nip rolls 20 are preferably located so as to withdraw the net 22 along the axis of the mandrel 16. The nip rolls 20 should have surfaces of rubber or other material capable of frictionally engaging the net 22 and are driven by any suitable driving means, such as a motor (not shown). From the nip rolls 20, the oriented net is withdrawn upwardly through the main bath 24 over a rotatably mounted roller 40.

The degree of stretching effected in the tubular net 22 by the aforedescribed embodiment of the present invention is determined mainly by the diameter of the mandrel 16, which controls the degree of radial stretching, and the peripheral speeds of the two sets of nip rolls 14 and 20, which control the degree of axial stretching. For good orientation, low density polyethylene net can be stretched to about five times its original mesh size, while high density polyethylene net can be stretched to about ten times its original mesh size. In general, the strength of the net increases as the degree of stretching increases.

The liquid baths surrounding the aforedescribed former 12 and mandrel 16 perform two functions. They control the temperature of the net passing over the former 12 and mandrel 16, and also provide lubrication between the net and former and net and mandrel so the net passes smoothly thereover.

Figure 3:
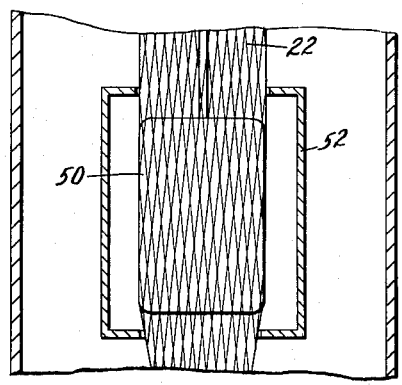
FIG. 3 is an elevation view, partially in cross section, of heat stabilizing apparatus suitable for use in the apparatus of FIGS. 1 and 2.

In the case of some polymeric nets, such as polyethylene terephthalate or poly-m-xylylene, the oriented net produced by the present process is shrinkable at relatively low temperatures. This shrinkability is desirable in some applications, such as where a skin-tight fit around an irregularly shaped object is desired. The item to be packaged can be inserted into a loose fitting bag made of the oriented net, and then the net can be heated above the second-order transition temperature to cause the net to shrink to conform to the shape of the item being packaged. In other applications, however, it is desirable to have net which is dimensionally stable to high temperatures. For such applications, the oriented net must be crystallized or heat stabilized by heating it to a heat stabilization temperature between its second-order transition temperature and the temperature at which the net fibers begin to lose molecular orientation. The second-order transition temperature is that temperature at which a discontinuity is noted in the first derivative of a primary thermodynamic property with respect to temperature, and is unaccompanied by the usual latent heat which appears in first-order transition temperatures. Some of the thermodynamic properties that can be observed in determining the second-order transition point are specific volume, specific heat, density, heat of refraction, and modulus of elasticity. Since the specific polymer composition and the rate of heating may affect the observed second-order transition temperature, the optimum heat stabilizing temperature and heating rate should be determined by simple empirical tests. In order to prevent shrinkage of the net during the heat stabilizing step, the net should be held at its desired dimensions while it is being heated. Preferred apparatus for carrying out the heat stabilizing step is shown in FIG. 3. The mandrel 50 and the tank 52 surrounding the mandrel 50 shown in FIG. 3 are identical to the mandrel 16 and tank 28 described above in connection with FIG. 1, except for the temperatures of the liquids in the tanks and the shapes of the mandrels. When the heat stabilizing step is required, the mandrel 50 and tank 52 shown in FIG. 3 are inserted in the apparatus shown in FIG. 1 between the tank 28 and the collapsing ring 18. Thus, both the radial and axial dimensions of the net are held constant while the temperature of the net is adjusted to the heat stabilizing temperature by the liquid in the tank 52. Crystallization is readily initiated in oriented polyethylene fibers as they are exposed to higher temperatures. The rate of crystallization increases as the temperature rises to about 180° C., and at temperatures above about 180° C., the rate of crystallization tends to decrease. As the temperature approaches the melting point, the net begins to lose some of the molecular orientation which had been imparted at the lower temperatures.

Figure 2:
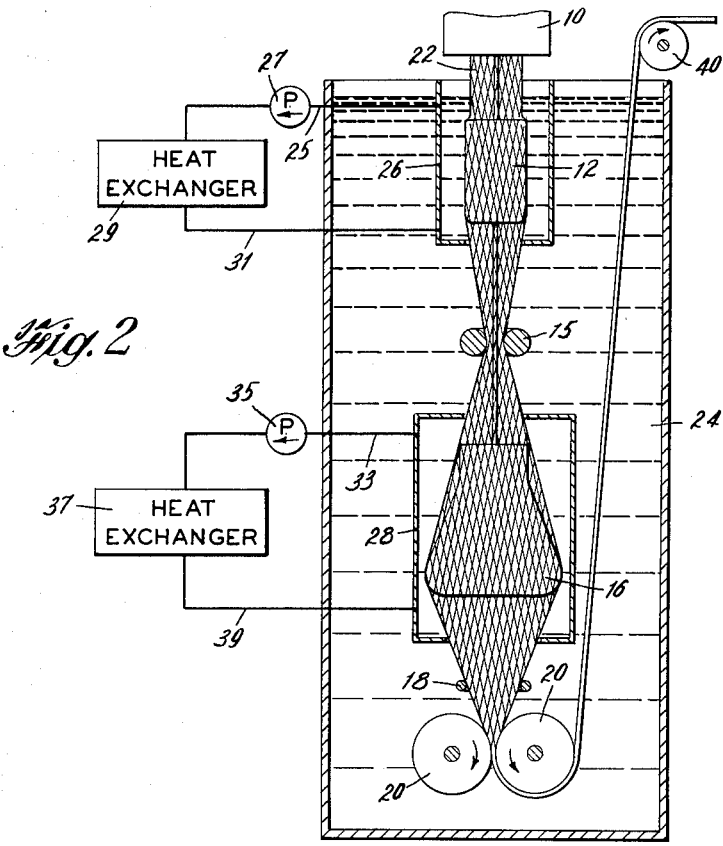
FIG. 2 is an elevation view, partially in cross section, of a modified embodiment of the invention.

A modified embodiment of the present invention is shown in FIG. 2. The apparatus shown in FIG. 2 is identical to that shown in FIG. 1 except that a restraining ring 15 is used in place of the nip rolls 14. The purpose of the restraining ring 15 is the same as that of the nip rolls 14, i.e., to restrain the net 22 passing therethrough against stretching in an axial direction. The restraining ring 15 is especially useful where a relatively small degree of axial stretching is desired, i.e., where the axial stretching force applied to the net by the nip rolls 20 is relatively small. Although only the two specific types of restraining means have been shown in the drawings, many other suitable restraining means will be apparent to those skilled in the art.

In an example of the present invention, the apparatus shown in FIG. 1 was used to stretch orient tubular net of polyethylene having a melt index between 1.7 and 2.2 and a density of 0.930 gram/cc. The initial diameter of the net was about 2 inches. The net was set by passing it over a former 12 having a diameter of 2.25 inches and immersed in a water bath maintained at a setting temperature of 52° C. The set net was withdrawn from the former 12 and the drum 26 by a pair of 3-inch diameter nip rolls 14 rotating at a surface speed of 8.5 feet per minute. The surfaces of the nip rolls were made of rubber and were located so as to be in tight contact with each other. Since the net fibers were about 0.030 inch in diameter, the net was squeezed tightly between the two nip rolls 14. The nip rolls 14 were located in the main bath 24, which was at a temperature of 52° C. From the nip rolls 14, the net was passed over a mandrel 16 immersed in a water bath maintained at an orientation temperature of 70° C. The shape of the mandrel was substantially as shown in FIG. 1 with an elliptical horizontal cross section the upper end having a diameter of 0.25 inch and the lower end having a large diameter of 3 inches and a small diameter of 1 inch. The length of the mandrel 16 was 9 inches. The net was withdrawn from the mandrel 16 and the tank 28 by a pair of 3-inch diameter nip rolls 20 driven at a speed of 44 feet per minute. About midway between the mandrel 16 and the nip rolls 20, the net passed through a collapsing ring 18 having an internal diameter of 2 inches. The surfaces of the nip rolls 20 were made of rubber and were in tight contact with each other so as to squeeze the net tightly therebetween. The net was finally withdrawn upwardly through the main water bath 24 and over a take-off roll 40. The resulting net was stretched to about 3.9 times its original mesh size and had uniform meshes throughout. The average fiber diameter of the connecting fibers had been reduced to about 0.013 inch, but the net bonds showed practically no signs of stretching. The tensile strength of the final biaxially oriented net product was 900 p.s.i., whereas the tensile strength of the original unoriented net was 800 p.s.i.

While various specific forms of the present invention have been illustrated and described herein, it is not intended to limit the invention to any of the details herein shown.

What is claimed is:

1. A process producing oriented tubular plastic net, comprising: forming extruded unset tubular plastic net; cooling said plastic net to a setting temperature thereof to set the net; passing said set tubular net over a mandrel having a diameter substantially greater than the internal diameter of said net; applying an axial stretching force to said net as it is withdrawn from said mandrel; subjecting said net, subsequent to the setting thereof and prior to passage over said mandrel, to a restraining force in cooperation with said axial stretching force to control the degree of axial stretching force applied to said net and substantially prevent said axial stretching force from extending to the unset portion of the extruded net, thereby simultaneously stretching the portion of said net around said mandrel in both axial and radial directions, said net being maintained at an orientation temperature while being stretched.

2. The process of claim 1 wherein the restraining force is applied to said net by passing said net through a pair of nip rolls.

3. The process of claim 1 wherein said net is maintained at orientation temperature and lubricated by passing said net into a liquid temperature bath maintained at an orientation temperature for said net.

4. The process of claim 1 wherein said tubular plastic net is high density polyethylene and said orientation temperature is between about 80° C. and about 120° C.

5. Apparatus for producing oriented tubular plastic net comprising: extruding means for providing tubular plastic net; a mandrel having a diameter greater than the internal diameter of said extruded tubular net spaced from said extruding means; means for passing said tubular net over said mandrel; means for withdrawing said net from said mandrel at a rate sufficient to effect axial stretching of said net around said mandrel; restraining means, disposed between said extruding means and said mandrel, for frictionally engaging and restraining said net in cooperation with said axial stretching means to control the degree of axial stretching applied to said net and substantially confine said axial stretching between said withdrawing and said restraining means; means for cooling and setting the tubular net situated between the extruding means and the restraining means and means for maintaining the set net at orientation temperature while it is being stretched.

6. Apparatus for producing oriented tubular plastic net comprising: extruding means for providing tubular plastic net; a former having a diameter about equal to the internal diameter of said extruded tubular net and spaced from said extruding means; a mandrel spaced from said former, remote from said extruding means, having a diameter substantially greater than the diameter of said former; means for passing said tubular net over said former and over said mandrel in that order; means for withdrawing said net from said mandrel at a rate sufficient to effect axial stretching of said net around said mandrel; restraining means, disposed between said former and said mandrel, for frictionally engaging and restraining said net in cooperation with said axial stretching means to control the degree of axial stretching applied to said net and substantially confine said axial stretching between said withdrawing and said restraining means; means for cooling and setting the extruded tubular net as it passes over said former and means for maintaining the set net at an orientation temperature while it is being stretched.

7. The apparatus of claim 6 wherein the mandrel has a diameter at least twice as great as the diameter of the former.

8. The apparatus of claim 6 wherein the restraining means is a pair of nip rolls.

9. The apparatus of claim 6 wherein the means for cooling and setting the extruded tubular net is a liquid temperature bath maintained at a setting temperature for said plastic net and surrounding said former and the means for maintaining the set net at said orientation temperature while it is being stretched is a liquid temperature bath maintained at an orientation temperature for said plastic net.

References Cited by the Examiner
UNITED STATES PATENTS

| | | | |
|---|---|---|---|
| 2,337,927 | 12/1943 | Reichel et al. | 18—145 |
| 2,919,467 | 1/1960 | Mercer | 18 |
| 3,140,330 | 7/1964 | Gutierrez | 264—288 |

ALEXANDER H. BRODMERKEL, *Primary Examiner.*